US007035297B1

(12) United States Patent
Denman et al.

(10) Patent No.: US 7,035,297 B1
(45) Date of Patent: Apr. 25, 2006

(54) CONTINUOUS WAVE SODIUM BEACON EXCITATION SOURCE

(75) Inventors: Craig A. Denman, Albuquerque, NM (US); Paul D. Hillman, Albuquerque, NM (US); Gerald T. Moore, Albuquerque, NM (US); John M. Telle, Tijeras, NM (US); Brent W. Grime, Dayton, OH (US); Joshua C. Bienfang, Washington, DC (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 320 days.

(21) Appl. No.: 10/769,723

(22) Filed: Jan. 30, 2004

(51) Int. Cl.
*H01S 3/10* (2006.01)
*G02F 1/35* (2006.01)
(52) U.S. Cl. .......................... 372/21; 359/330
(58) Field of Classification Search ................ 372/21; 359/330
See application file for complete search history.

(56) References Cited

U.S. PATENT DOCUMENTS 6,384,973 B1   5/2002   Moore
6,424,454 B1   7/2002   Moore

OTHER PUBLICATIONS

W. Happer, G. J. MacDonald, C. E. Max, and F. J. Dyson, "Atmospheric-turbulence compensation by resonant optical backscattering from the sodium layer in the upper atmosphere," *J. Opt. Soc. Am A*, vol. 11, No. 1, pp. 263-276 (Jan. 1994).
R. Foy and A. Labeyrie, "Feasibility of adaptive telescope with laser probe," *Astronomy and Astrophysics*, vol. 152, L29-31 (1985).
L. A. Thompson and C. S. Gardner, "Experiments on laser guidestars at Mauna Kea Observatory for adaptive imaging in astronomy," *Nature*, vol. 328, pp. 229-231 (Jul. 16, 1987).

(Continued)

*Primary Examiner*—Minsun Harvey
*Assistant Examiner*—Jeffrey Lane
(74) *Attorney, Agent, or Firm*—James M. Skorich (57) ABSTRACT

1064-nm and 1319-nm light respectively generated by two lasers is combined and injected into a doubly resonant sum-frequency generator. The optical path length of the sum-frequency generator is adjusted responsive to feedback of the 1319-nm light to maintain 1319-nm resonance. Feedback of 1064-nm light is concurrently used to adjust the 1064-nm laser responsive to the optical path length to maintain 1064-nm resonance. Light output from the sum-frequency generator is compared to the sodium $D_{2a}$ wavelength i.e., approximately 589 nm, and the 1319-nm laser is responsively adjusted to eliminate any differential. This abstract is provided to comply with the rules requiring an abstract, and is intended to allow a searcher or other reader to quickly ascertain the subject matter of the technical disclosure. It is submitted with the understanding that it will not be used to interpret or limit the scope or meaning of the claims.

26 Claims, 2 Drawing Sheets

OTHER PUBLICATIONS

R. A. Humphries, C. A. Primmerman, L. C. Bradley, and J. Hermann, "Atmospheric-turbulence measurements using a synthetic beacon in the mesospheric sodium layer," *Opt. Letters*, vol. 16, No. 18, pp. 1367-1369 (Sep. 15, 1991).

T. H. Jeys, K. F. Wall, and J. Korn, "840-Hz Nd:YAG Laser Source of Sodium Resonance Radiation," *Final Report to the U.S. Air Force Phillips Laboratory* under U.S.A.F. Contract F19628-90-C-0002, Lincoln Laboratory, Massachusetts Institute of Technology, Lexington, Massachusetts (May 11, 1992).

T. Jeys and V. Daneu, "Diode-pumped, Nd:YAG Source of Sodium-Resonance Radiation for Atmospheric Adaptive Optics," *ESO Workshop on Laser Technology for Laser Guide Star Adaptive Optics Astronomy*, Garching, Germany (Jun. 23-26, 1997).

J. D. Vance, C.-Y. She, and H. Moosmüller, "Continuous-wave, all-solid-state, single frequency 400-mW source at 589 nm based on doubly resonant sum-frequency mixing in a monolithic lithium niobate resonator," *Appl. Opt.*, vol. 37, No. 21, pp. 4891-4896 (Jul. 20, 1998).

J. M. Telle, P. W. Milonni, and P. D. Hillman, "Comparison of pump-laser characteristics for producing a mesospheric sodium guidestar for adaptive optical systems on large aperture telescopes," in *High-Power Lasers*, S.Basu, Editor, *Proceedings of SPIE*, vol. 3264, pp. 37-42 (Jan. 1998).

P. W. Milonni, H. Fern, J. M. Telle, and R. Q. Fugate, "Theory of continuous-wave excitation of the sodium beacon," *J. Opt. Soc. Am. A*, vol. 16, No. 10, pp. 2555-2566 (Oct. 1999).

P. W. Milonni, R. Q. Fugate, and J. M. Telle, "Analysis of measured photon returns from sodium beacons," *J. Opt. Soc. Am. A*, vol. 15, No. 1, pp. 217-233 (Jan. 1998).

L. C. Bradley, "Pulse-train excitation of sodium for us as a synthetic beacon," *J. Opt. Soc. Am. B*, vol. 9, No. 10, pp. 1931-1944 (Oct. 1992).

J. R. Morris, "Efficient excitation of a mesospheric sodium laser guide star by intermediate-duration pulses," *J. Opt. Soc. Am. A*, vol. 11, No. 2, pp. 832-845 (Feb. 1994).

A. L. Alexandrovski, M. M. Fejer, R. R. Route, and R. L. Byer, "Photothermal absorption measurements in optical materials," in *Proc. 1999 Annual Affiliates Meeting, Center for Nonlinear Optical Materials*, Stanford, California, 16 pages (1999).

K. Kato, "Temperature-Tuned 90° Phase-Matching Properties of $LiB_3O_5$," *IEEE J. Quantum Electron.*, vol. 30, No. 12, pp. 2950-2952 (Dec. 1994).

S. T. Yang, C. C. Pohalski, E. K. Gustafson, R. L. Byer, R. S. Feigelson, R. J. Raymakers, and R. K. Route, "6.5-W, 532-nm radiation by cw resonant external-cavity second-harmonic generation of an 18-W Nd:YAG laser in $LiB_3O_5$," *Opt. Letters*, vol. 16, No. 19, pp. 1493-1495 (Oct. 1, 1991).

Y. Kaneda and S. Kubota, "Theoretical treatment, simulation, and experiments of doubly resonant sum-frequency mixing in an external resonator," *Appl. Opt.*, vol. 36, No. 30, pp. 7766-7775 (Oct. 20, 1997).

R. W. P. Drever, J. L. Hall, F. V. Kowalski, J. Hough, G. M. Ford, A. J. Munley, and H. Ward, "Laser Phase and Frequency Stabilization Using an Optical Resonator," *Appl. Phys. B, Photophysics and Laser Chem.*, vol. 31, pp. 97-105 (1983).

G. T. Moore, "Resonant Sum-Frequency Generation," *IEEE J. Quantum Electron.*, vol. 38, No. 1, pp. 12-18 (Jan. 2002).

M. P. Murdough and C. A. Denman, "Mode-volume and pump-power limitations in injection-locked $TEM_{00}$ Nd:YAG rod lasers," *Appl. Opt.*, vol. 35, No. 30., pp. 5925-5936 (Oct. 20, 1996).

R. F. Teehan, J. C. Bienfang, and C. A. Denman, "Power scaling and frequency stabilization of an injection-locked Nd:YAG rod laser," *Appl. Opt.*, vol. 39, No. 18, pp. 3076-3084 (Jun. 20, 2000).

J. C. Bienfang, R. F. Teehan, and C. A. Denman, "Phase noise transfer in resonant optical cavities," *Rev. Sci. Instr.*, vol. 72, No. 8, pp. 3208-3214 (Aug. 2001).

H. Schnitzler, U. Fröhlich, T. K. W. Boley, A. E. M. Clemen, J. Mlynek, A. Peters and S. Schiller, "All-solid-state tunable continuous-wave ultraviolet source with high spectral purity and frequency stability," *Appl. Opt.*, vol. 41, No. 33, pp. 7000-7005 (Nov. 20, 2002).

"Directed energy directorate achieves 6 watts of output power from initial tests of its mesospheric sodium excitation source," *Success Story*, 02-DE-06, Air Force Research Laboratory, Wright-Patterson AFB, Ohio (Oct. 2002).

CONTINUOUS WAVE SODIUM BEACON EXCITATION SOURCE

STATEMENT OF GOVERNMENT INTEREST

The conditions under which this invention was made entitle the Government of the United States, as represented by the Secretary of the Air Force, to the entire right, title and interest therein, including foreign rights, pursuant to paragraph I(a) of Executive Order 10096.

BACKGROUND OF THE INVENTION

This invention relates to lasers and nonlinear optics and, more particularly, uses several laser beams in conjunction with sum-frequency generation to produce a high-power beam having a desired wavelength, e.g., the sodium $D_{2a}$ spectral line.

The earth's atmosphere distorts light traveling through it because of time and spatially varying fluctuations in its refractive index. Such distortion limits the resolution of terrestrial telescopes, and was the motivation for launching the successful, but very expensive, Hubble telescope into earth orbit. However, ground-based telescopes can achieve a resolution surpassing that of the Hubble space telescope by means of adaptive optics, a technique whereby the surface of a deformable telescope mirror is changed as a function of time to compensate for atmospheric distortion.

Measuring the distortion requires that there be a bright optical source in the sky, such as a bright star, located close to the object to be observed. Since natural stars of sufficient brightness are too rare to permit compensated imaging except over a tiny fraction of the sky, an alternative is to produce one or more artificial guide stars by means of back-scattered light from a laser beam or similar source of coherent radiation directed from the site of the telescope into the area of the sky proximate to the object to be observed. Such guide stars can be produced by exciting resonance fluorescence at a 589-nm wavelength, i.e., at the sodium $D_{2a}$ spectral line, from a layer of sodium atoms that circumscribes the earth in the mesosphere at an altitude of approximately 90 km.

Although high-power dye lasers can be operated at this wavelength to excite the sodium layer, they are inefficient, bulky, expensive, and use chemicals which are toxic and which degrade over time, concomitantly resulting in degradation of performance. The desirability of an all-solid-state sodium beacon excitation source has long been recognized. W. Happer, G. J. MacDonald, C. E. Max, and F. J. Dyson, "Atmospheric-turbulence compensation by resonant optical backscattering from the sodium layer in the upper atmosphere," *J. Opt. Soc. Am. A*, Vol. 11, No. 2, pp. 263–276 (January 1994). However, the goal of building a reliable and efficient device that generates sufficient power with good beam quality has been elusive, despite over a decade of endeavor.

By a natural coincidence, sodium resonance radiation at $\lambda_d$=589 nm can be produced by sum-frequency generation of the Nd:YAG laser lines at $\lambda_p$=1064 nm and $\lambda_s$=1319 nm. This has motivated the development of pulsed sources using single-pass sum-frequency generation in lithium triborate (LiB$_3$O$_5$). T. Jeys and V. Daneu, "Diode-pumped, Nd:YAG source of sodium-resonance radiation for atmospheric adaptive optics," *ESO Workshop on Laser Technology for Laser Guide Star Adaptive Optics Astronomy*, Garching, Germany (Jun. 23–26, 1997); and a low-power continuous-wave source using doubly resonant sum-frequency generation in lithium niobate (LiNbO$_3$). J. D. Vance, C.-Y. She, and H. Moosmuller, "Continuous-wave, all-solid-state, single frequency 400-mW source at 589 nm based on doubly resonant sum-frequency mixing in a monolithic lithium niobate resonator," *Applied Optics*, Vol. 37, No. 2, pp. 4891–4896 (Jul. 20, 1998). The pulsed sources have proved too unreliable for use in conjunction with adaptive optics, whereas absorption in lithium niobate precludes the generation of high power in this crystal.

Various theoretical studies have been completed comparing the efficiency of different pulse formats, including continuous wave. J. M. Telle, P. W. Milonni, and P. D. Hillman, "Comparison of pump-laser characteristics for producing a mesospheric sodium guidestar for adaptive optical systems on large aperture telescopes," in *High-Power Lasers*, S. Basu, Editor, *Proceedings of SPIE*, Vol. 3264, pp. 37–42 (January 1998).

The advantages of continuous wave are high duty cycle and narrow bandwidth. Both effects enhance the sodium fluorescence return, as long as saturation is avoided. Continuous wave sources have been used, but have only been able to generate low beam power, i.e., power too low for astronomical imaging using adaptive optics to correct atmospheric distortion.

It follows that there is a need in the art for a terrestrial apparatus capable of generating an artificial guide star by means of back-scattered light from a laser beam or similar source of coherent radiation and, more particularly, by creating such a guide star by exciting resonance fluorescence from a layer of sodium atoms that circumscribes the earth in the mesosphere. The present invention has fulfilled this need in the art.

SUMMARY OF THE INVENTION

Briefly, the invention is comprised of an injection-locked 1064-nm laser, an injection-locked 1319-nm laser, a doubly resonant sum-frequency generator (hereinafter referred to as "SFG"), and a heated sodium-vapor cell for measuring Doppler-free fluorescence. Each of the injection-locked lasers includes a single-frequency high-power ring oscillator containing a pair of Brewster-cut Nd:YAG rods. The ring oscillators are respectively injection locked by low power, single-frequency, linearly-polarized lasers using the Pound-Drever-Hall stabilization technique, and are unidirectional when so injection-locked. Resonance of the respective laser frequencies in the oscillators is maintained by electronic feedback servo circuitry.

The 1064-nm and 1319-nm light, respectively generated by the two injection-locked lasers, is combined by a dichroic mirror and, after being mode matched, is injected into the SFG comprised of a bowtie resonator that includes a lithium triborate (LiB$_3$O$_5$) crystal for generating 589-nm light and a scraper mirror for extracting the 589-nm light.

The optical path length of the SFG is adjusted responsive to feedback of the 1319-nm light to maintain 1319-nm resonance. Feedback of 1064-nm light is concurrently used to adjust the 1064-nm low-power laser responsive to the foregoing changes in the SFG optical path length, to maintain 1064-nm resonance in the SFG.

The extracted 589-nm light is directed towards the desired celestial area. It has the wavelength and power required to generate sodium $D_{2a}$ fluorescence in the mesospheric sodium layer. A small portion of the 589-nm light is directed through the heated sodium-vapor cell, where Doppler-free spectral features of the sodium fluorescence are detected. The 1319-nm low-power laser is responsively adjusted, either manually or by an automatic mechanism, to maintain the output from the SFG at the desired sodium $D_{2a}$ wavelength, i.e., approximately 589.159 nm. The spectral linewidth of the extracted 589-nm light is of the order of 10 kHz, much narrower than the 1 GHz spectral linewidth of atmospheric $D_{2a}$ resonance and the 10 MHz spectral linewidth of Doppler-free $D_{2a}$ resonance.

Another embodiment employs an additional 1064-nm low-power laser. One of the two 1064-nm low-power lasers is tuned such that the light output from the SFG has a wavelength at the center of the sodium $D_{2a}$ spectral line, while the other low-power laser is detuned such that the output from the SFG has a wavelength slightly off of the spectral line. The two light beams are oriented with orthogonal polarization states and then co-axially combined.

An electro-optic polarization rotator switches between the two beams and only the selected beam proceeds through the remainder of the apparatus, as previously described. Where the selected beam is the one at the sodium $D_{2a}$ spectral line, the mesospheric sodium layer becomes fluorescent, while no fluorescence is produced when the other beam is selected. This allows the Rayleigh background light from the lower atmosphere to be measured and subtracted from the fluorescence of the mesospheric guide star.

Other aspects and advantages of the present invention will become apparent from the following detailed description, taken in conjunction with the accompanying drawings, and illustrating by way of example the principles of the invention.

BRIEF DESCRIPTION OF THE DRAWINGS

In the accompanying drawings:
FIG. 2 is a schematic drawing illustrating an alternative embodiment of the present invention wherein
FIG. 1 is modified by adding several elements, particularly a low-power 1064-nm laser.

DETAILED DESCRIPTION

Figure 1:
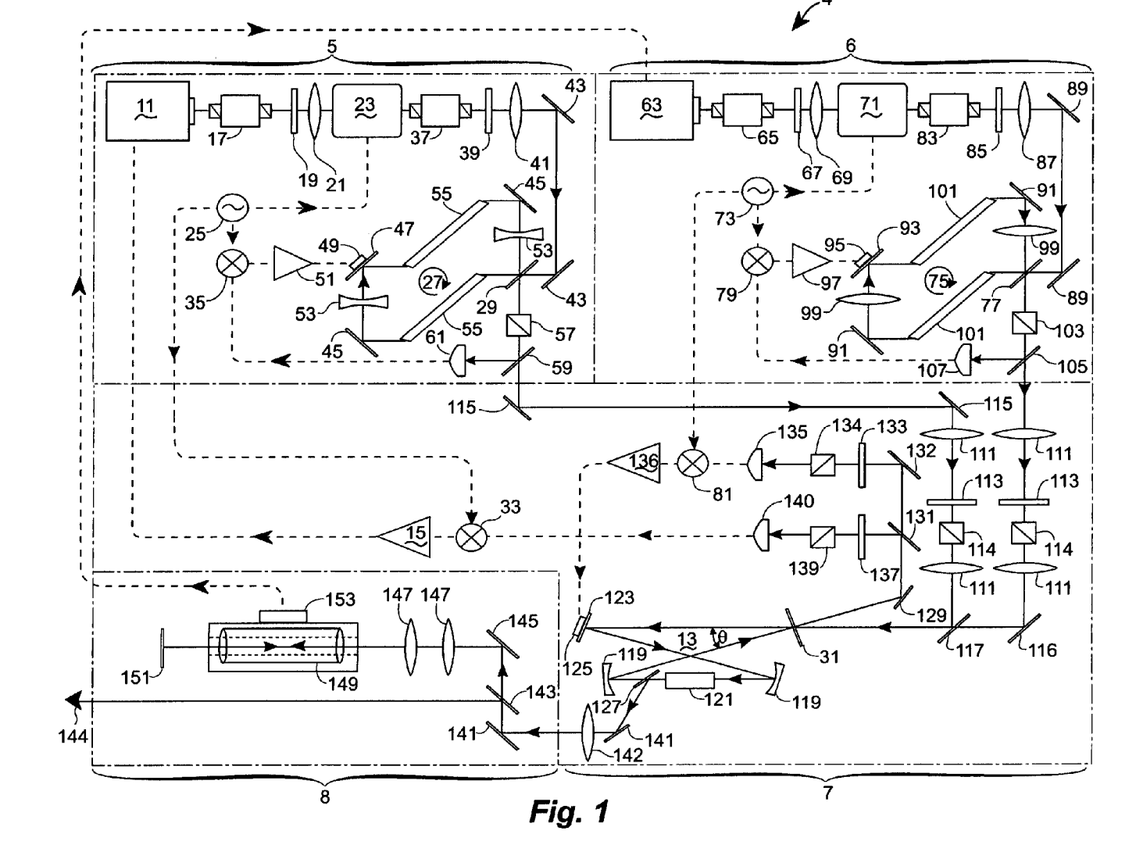
FIG. 1 is a schematic drawing of the present invention.

FIG. 1 is a schematic diagram of continuous-wave sodium beacon excitation source 4, an embodiment of the present invention. Solid lines denote optical beam paths, while dashed lines denote electrical connections. Faraday isolators consist of Faraday rotators sandwiched between polarization beam splitters. For simplicity, beam dumps associated with polarization beam splitters are not shown.

Excitation source 4 is comprised of four interconnected modules, modules 5, 6, 7 and 8. Module 5 comprises a 1064-nm injection-locked laser. Module 5 includes laser 11, which produces a low-power, single frequency, linearly polarized, continuous-wave 1064-nm beam. The wavelength of laser 11 can be adjusted over a limited range. Lightwave Electronics Corporation of Mountain View, Calif., manufactures a device of this type. As will be explained in conjunction with the subsequent discussion of module 7, doubly resonant SFG 13 generates 589-nm light and servo amplifier 15 electronically adjusts the frequency of laser 11 to maintain locking of the 1064-nm light to SFG 13.

It is also to be noted that the wavelengths mentioned herein, i.e., 1064, 589, and 1319 nm, are approximations accurate to 1 nm. As will become clear, the respective wavelengths output by the described optical elements are controlled to a resolution better than $5 \times 10^{-6}$ nm during the operation of the invention by virtue of feedback loops that enable the invention ultimately to generate a high-power laser beam having the precise wavelength and stability that is desired.

The 1064-nm light from laser 11 passes through Faraday isolator 17 to prevent light from counter-propagating back into laser 11. The light then passes through half-wave plate 19, which rotates the polarization direction; through mode-matching lens 21; and then through electro-optic radio frequency phase modulator 23.

Local oscillator 25 produces an 18 MHz sine-wave voltage, which is applied to phase modulator 23 to produce phase sidebands on the 1064-nm light. These sidebands are used for Pound-Drever-Hall locking of 1064-nm high-power ring oscillator 27 to laser 11, and also for locking the output of module 5 to SFG 13. Input coupler 29 for ring oscillator 27 and input coupler 31 of SFG 13 reflect the phase sidebands because the sidebands are not resonant with either ring oscillator 27 or SFG 13 while the foregoing two components are locked onto the resonance of the wavelength of laser 11. The voltage from the local oscillator 25 is also applied to mixer 33 in module 7 and mixer 35 in module 5.

After traversing Faraday isolator 37, half-wave plate 39, mode-matching lens 41, and turning mirrors 43, the low-power 1064-nm beam from laser 11 passes through the partially transmitting input coupler 29 and is injected into ring oscillator 27. The reflective surfaces of input coupler 29 and mirrors 45 and 47 of ring oscillator 27 are flat. Mirrors 45 and 47 are highly reflective at 1064 nm. Mirror 47 is mounted on piezoelectric transducer 49. The latter element is capable of translating mirror 47 to adjust the length of the optical path of ring oscillator 27.

Piezoelectric transducer 49 is driven by servo amplifier 51, which in turn is controlled by the zero-crossing error voltage output of mixer 35. Servo amplifier 51 includes proportional-integral analog circuitry to supply proper negative feedback to piezoelectric transducer 49, and provides gain roll-off and phase margin sufficient to avoid exciting the first mechanical resonance of piezoelectric transducer 49.

Ring oscillator 27 also includes intracavity concave lenses 53 and Nd:YAG rods 55. A combination of focusing by lenses 53 and thermal lensing in rods 55 obtains a stable cavity. Rods 55 are cut at the Brewster angle, helping to ensure linearly polarized operation of ring oscillator 27. Diode arrays (not shown) pump rods 55 transversely.

The high-power output of ring oscillator 27 is transmitted through input coupler 29, whereupon it joins the phase sidebands reflected from input coupler 29. The output and sidebands then pass through polarizing beam splitter 57 to enhance the degree of linear polarization over that obtainable from ring oscillator 27 alone. A small fraction of the beam power is reflected from beam splitter 59 and impinges on light detector 61. The radio frequency output of light detector 61 is applied to mixer 35, where it is mixed in quadrature with the signal from local oscillator 25, i.e., a 90° phase difference between the radio frequency input from 61 and the signal from local oscillator 25, to produce the input to servo amplifier 51.

The output of mixer 35 is generated using the Pound-Drever-Hall stabilization technique, a laser frequency stabilization technique well known to those skilled in optics. The output of servo amplifier 51 is applied to piezoelectric transducer 49, which adjusts the optical path length of ring oscillator 27 to maintain resonance in the cavity, i.e., the cavity optical path length must be an integral number of light wavelengths. The resonance of ring oscillator 27 with respect to the output of laser 11 maintained by means of the aforementioned feedback loop causes the former to lase unidirectionally at the central frequency of the 1064-nm beam emanating from laser 11. In this regime of operation, ring oscillator 27 is said to be injection locked to the output of laser 11.

Module 6 comprises a 1319-nm injection-locked laser. Module 6 includes laser 63, which produces a low-power, single-frequency, linearly polarized, continuous-wave 1319-nm laser beam. Lightwave Electronics Corporation of Mountain View, Calif., manufactures such a device. The wavelength of laser 63 can be adjusted over a limited range. The low-power light from 63 passes through Faraday isolator 65 to prevent light from counter-propagating back into laser 63. The 1319-nm light then passes through half-wave plate 67, which rotates the polarization direction, through mode-matching lens 69, and then through an electro-optic radio frequency phase modulator 71.

Local oscillator 73 generates a 21 MHz sine-wave voltage, which is applied to phase modulator 71 to produce phase sidebands on the 1319-nm light. These sidebands are used for Pound-Drever-Hall locking of 1319 nm high-power ring oscillator 75 to laser 63, and also for locking SFG 13 to the output of module 6. Input coupler 77 for oscillator 75 and input coupler 31 of SFG 13 reflect the sidebands because the sidebands are not resonant with either ring oscillator 75 or SFG 13 while the foregoing two components are locked onto the resonance of the wavelength of laser 63. The voltage from local oscillator 73 also is applied to mixer 79 of module 6 and mixer 81 in module 7. After traversing Faraday isolator 83, half-wave plate 85, mode-matching lens 87, and turning mirrors 89, the low power 1319-nm beam from laser 63 passes through partially transmitting input coupler 77 and is injected into ring oscillator 75.

Mirrors 91 and 93 of the cavity for ring oscillator 75 are highly reflective at 1319 nm. The reflective surfaces of input coupler 77 and mirrors 91 and 93 are flat. Input coupler 77 and mirrors 91 and 93 are specially coated to reflect light at 1319 nm, and to be highly transmissive at 1064 nm to prevent lasing at the latter wavelength. Mirror 93 is mounted on piezoelectric transducer 95. The latter element is capable of translating mirror 93 to adjust the cavity optical path length.

Piezoelectric transducer 95 is driven by servo amplifier 97, which is in turn controlled by the zero-crossing error voltage output of mixer 79. Servo amplifier 97 includes proportional-integral analog circuitry to supply proper negative feedback to piezoelectric transducer 95, and provides gain roll-off and phase margin sufficient to avoid exciting the first mechanical resonance of piezoelectric transducer 95. Ring oscillator 75 also includes intracavity lenses 99 and Nd:YAG rods 101. A combination of focusing by lenses 99 and thermal lensing in rods 101 is used to obtain a stable cavity. Diode arrays (not shown) pump rods 101 transversely.

Ring oscillators 27 and 75 are each an example of a power oscillator to be frequency-locked to lasers 11 and 63, respectively. Each of ring oscillators 27 and 75 could be replaced by a ring oscillator having a number of rods other than two, or by a power oscillator having a completely different configuration, e.g., a Nd:YAG slab or fiber.

The high-power output of ring oscillator 75 is transmitted through input coupler 77, whereupon it joins the phase sidebands reflected from input coupler 77. The output and sidebands then pass through polarizing beam splitter 103 to enhance the degree of linear polarization over that obtainable from ring oscillator 75 alone.

A small fraction of the beam power is reflected from beam splitter 105 and impinges on light detector 107. The radio-frequency output of detector 107 is applied to mixer 79, where it is mixed in quadrature with the signal from local oscillator 73 to produce the input to servo amplifier 97. The output of mixer 79 is obtained by using the Pound-Drever-Hall stabilization technique.

The output of servo amplifier 97 is applied to piezoelectric transducer 95, which adjusts the optical path length of ring oscillator 75 to maintain resonance in the cavity. The resonance of ring oscillator 75 with respect to the output of laser 63 maintained by means of the aforementioned feedback loop causes the former to lase unidirectionally at the central frequency of the 1319-nm beam emanating from laser 63. In this regime of operation, ring oscillator 75 is said to be injection locked to the output of laser 63.

Alternatively, high-power amplifiers could be used to increase the low power of lasers 11 and 63, instead of high-power ring oscillators 27 and 75, respectively. Such an alternative embodiment would not require internal feedback loops using beam splitter 59, light detector 61, mixer 35 and servo amplifier 51, with respect to ring oscillator 27; or beam splitter 105, light detector 107, mixer 79 and servo amplifier 97, with respect to ring oscillator 75. Another embodiment of the invention would involve respectively replacing modules 5 and 6 with high-power single-frequency lasers. Each of the high-power lasers would have to be frequency controllable.

Turning to module 7, each of the infrared beams from modules 5 and 6 pass through convex mode-matching lenses 111, half-wave plates 113 and polarization beam splitters 114, to allow independent adjustment of the power of the infrared beams ultimately impinging on SFG 13. The 1064-nm beam emanating from module 5 is reflected onto this path by turning mirrors 115, and after traversing the aforementioned optical elements it impinges on dichroic mirror 117. The 1319-nm beam emanating from module 6 is reflected by turning mirror 116 to impinge on dichroic mirror 117 after traversing a separate set of the aforementioned optical elements having optical properties appropriate to the 1319-nm wavelength, i.e., appropriate anti-reflection coatings and an appropriate design for half-wave plate 113. The two beams respectively impinge on opposite surfaces of dichroic mirror 117, with the two surfaces being respectively coated to reflect the 1064-nm beam and transmit the 1319-nm beam, thus combining them into a single co-axial beam.

Doubly resonant SFG 13 consists of two highly reflective concave mirrors 119, lithium triborate ($LiB_3O_5$) crystal 121, flat input coupler 31 which partially transmits both 1064-nm and 1319-nm light, and flat highly reflective mirror 123 mounted on piezoelectric transducer 125. As an example, crystal 121 is 2 cm long and uses noncritical type-I phase matching. As previously noted, input coupler 31 reflects the phase sidebands from both the 1064-nm and 1319-nm light because the sidebands are not resonant with SFG 13 while it is locked onto resonance with the wavelengths (center frequencies) of lasers 11 and 63.

The end surfaces of crystal 121 are anti-reflection coated for wavelengths of 1064 nm, 1319 nm, and 589 nm; thus, the ends transmit light of all three foregoing wavelengths with minimal loss. The fold angle $\ominus$ of SFG 13 should be kept as small as possible to minimize aberrations. Moreover, the optimal choice for the reflectivities of input coupler 31 depends on the available power of the beams produced by the lasers of modules 5 and 6.

Scraper mirror 127 is inserted at the Brewster angle in the resonator between curved mirrors 119 such that the light in SFG 13 passes through crystal 121 before impinging on scraper mirror 127. Scraper mirror 127 has a coating on its front surface onto which light is incident, to highly transmit the p-polarized infrared light, i.e., the 1064-nm and 1319-nm light, and highly reflect the s-polarized 589-nm light. This extracts the s-polarized 589-nm light from SFG 13.

Input coupler 31 transmits a portion of the infrared light circulating within SFG 13 and incident on input coupler 31 from within SFG 13. This transmitted light, together with the phase sidebands and the portion of the externally incident infrared light at the central frequencies reflected by input coupler 31, is directed by turning mirror 129 onto dichroic beam splitter 131, which separates it into 1064-nm and 1319-nm beams. The 1319-nm beam passes through dichroic beam splitter 131, reflects off of turning mirror 132, and passes through half-wave plate 133 and polarization beam splitter 134 before impinging on light detector 135. The angular rotation of half-wave plate 133 is set so as to reduce the infrared power impinging on detector 135 to a level that avoids saturating this detector. Polarization beam splitter 134 shunts the superfluous power to a beam dump (not shown).

Detector 135 produces a voltage signal based on the Pound-Drever-Hall stabilization technique. Mixer 81 mixes in quadrature the signal from light detector 135 with the signal from local oscillator 73 to produce a zero-crossing error voltage input to servo amplifier 136. Responsive to the signal from servo amplifier 136, piezoelectric transducer 125 translates mirror 123 to adjust the length of the optical path of SFG 13 to keep it locked onto resonance with the 1319-nm output of module 6. Servo amplifier 136 includes proportional-integral analog circuitry to supply proper negative feedback to piezoelectric transducer 125, and provides gain roll-off and phase margin sufficient to avoid exciting the first mechanical resonance of piezoelectric transducer 125.

Dichroic beam splitter 131 reflects the 1064-nm beam through half-wave plate 137 and polarization beam splitter 139, and onto light detector 140. The angular orientation of half-wave plate 137 is set so as to reduce the infrared power impinging on detector 140 to a level that avoids saturating this detector. Polarization beam splitter 139 shunts the superfluous power to a beam dump (not shown).

Detector 140 produces a voltage signal based on the Pound-Drever-Hall stabilization technique. Mixer 33 mixes in quadrature the signal from light detector 140 with the signal from local oscillator 25 to produce a zero-crossing error voltage input to servo amplifier 15.

The wavelength of the 1064-nm light produced by laser 11 is adjusted responsive to the signal from servo amplifier 15, to maintain the locked resonance of the output of module 5 to SFG 13. Servo amplifier 15 includes proportional-integral analog circuitry to supply proper negative feedback to a frequency actuating transducer (a piezoelectric element) included within laser 11, and provides gain roll-off and phase margin sufficient to avoid exciting the first mechanical resonance of the frequency actuating transducer of laser 11.

An alternative configuration (not shown) eliminates dichroic beam splitter 131 and instead sends both infrared wavelengths reflected from input coupler 31 to a single light detector. The signal produced by the single detector is then split and applied to mixers 33 and 81, respectively. The optical path length of SFG 13 and the wavelength of the light emitted by laser 11 are then adjusted as previously described.

The 589-nm light reflected from scraper mirror 127 reflects off turning mirrors 141 and traverses collimating lens 142 before impinging on beam-splitting mirror 143. Mirror 143 reflects most of the light as output light beam 144 to be directed towards the desired celestial area. Output beam 144 creates the desired artificial guide star by impinging on the mesospheric sodium layer and exciting the sodium atoms to cause fluorescence. Photon return from the mesosphere is enhanced by converting output beam 144 to circular polarization before propagating the light to the mesosphere. This conversion can be accomplished by passing output beam 144 through a quarter-wave plate (not shown).

Using a fold angle ⊖ of 7°, reflectivities for input coupler 31 of 0.954 at 1064 nm and 0.925 at 1319 nm, and with the lasers of modules 5 and 6 generating power of 24 watts and 15 watts, respectively, the power of output beam 144 was 22.5 watts of 589-nm light. The beam quality was diffraction limited. Lower reflectivities of input coupler 31 would be preferable if the power of the infrared beams generated by the lasers of modules 5 and 6 were higher. If, in this circumstance, the input coupler reflectivities are lowered this would broaden the infrared resonance bandwidth of SFG 13 and, consequently, necessitate that the radio frequencies applied to phase modulators 23 and 71 be increased so that the phase sidebands would lie well outside the resonance of SFG 13. Also, the frequencies should be chosen to have a high common multiple to avoid any cross-talk noise in the event that a single light detector for SFG 13 were to be used.

Beam splitting mirror 143 transmits the remaining, unreflected portion of the 589-nm light onto turning mirror 145, whereupon the light beam passes through telescoping and collimating lenses 147 and into heated sodium-vapor cell 149. Highly reflective mirror 151 reflects the light back through cell 149 in the direction opposite to the direction from which it entered. The counter-propagating beams in cell 149 produce Doppler-free spectral features in the sodium fluorescence, which are sensed by side-port fluorescence detector 153. The signal from detector 153 is used to form a zero-crossing error signal to apply negative feedback to laser 63. The wavelength of laser 63 is adjusted responsive to the signal from detector 153 to stabilize and maintain the 589-nm light of output beam 144 at the center of the sodium $D_{2a}$ spectral line.

Figure 2:
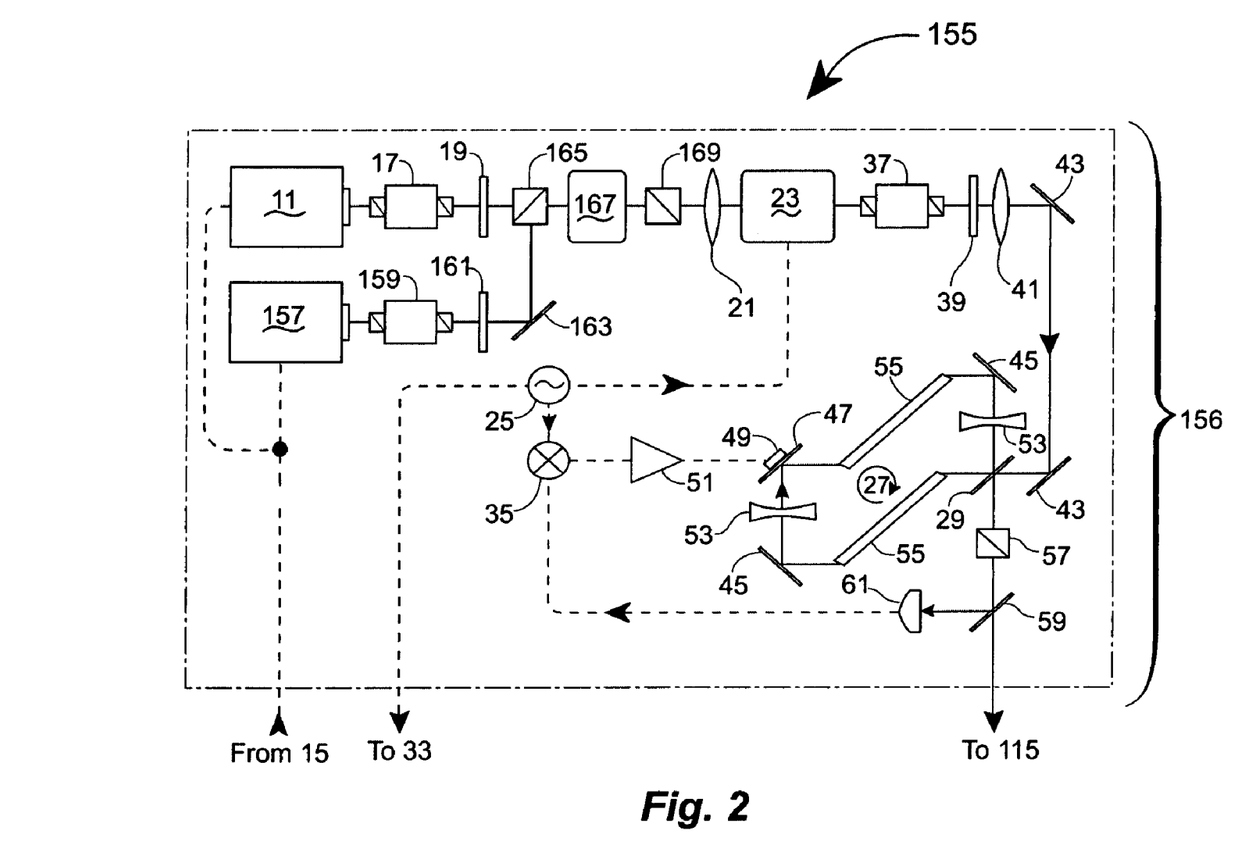

FIG. 2 shows continuous wave sodium beacon excitation source 155, another embodiment of the present invention wherein module 5 is replaced by module 156. Module 5 is augmented to form module 156 by adding an additional low-power 1064-nm laser 157, Faraday isolator 159, half-wave plate 161, directional mirror 163, polarization beam combiner 165, electro-optic polarization rotator 167, and polarization beam splitter 169. The remaining components of excitation source 155, i.e., modules 6, 7 and 8, are identical to those of excitation source 4, and operate as previously described.

Lasers 11 and 157 are tuned to slightly different wavelengths, such that output beam 144 generated using one of them is tuned to the center of the sodium $D_{2a}$ spectral line, while output beam 144 generated using the other low-power laser is tuned off of this resonance wavelength so as not to produce an artificial guide star. Half-wave plates 19 and 161 are rotated such that the beams from lasers 11 and 157 both impinge on polarization beam combiner 165 with orthogonal linear polarizations.

The combined beam then passes through electro-optic polarization rotator 167, which, depending on the voltage applied to it, either leaves the polarizations at the two wavelengths unchanged or interchanges them. Electro-optic polarization rotator 167 switches between the beams from lasers 11 and 157 such that only the beam with the selected polarization, i.e., wavelength, proceeds through polarization beam splitter 169. One of the two emerging beams next passes through lens 21 to phase modulator 23, and then on to the remainder of the elements of excitation source 155, as previously described in conjunction with excitation source 4.

Switching between these two wavelengths thus switches the fluorescence from the mesospheric guide star on and off, while leaving the Rayleigh scattering from the lower atmosphere essentially unchanged. This allows the Rayleigh background to be subtracted from the fluorescence of the mesospheric guide star. Replacing electro-optic polarization rotator 167 by a half-wave plate and manually rotating the plate by 45° would produce the same switching effect, but the electro-optic switching is much faster.

The intervals when the frequency of output beam 144 is switched off of the sodium resonance frequency would typically be too brief for the wavelength of laser 63 to be adjusted responsive to the signal from detector 153, to maintain the 589-nm light of output beam 144 at the sodium $D_{2a}$ spectral line, i.e., the off interval would be over before laser 63 could respond by changing its output wavelength. Alternatively, the signal from detector 153 could be switched off, e.g., by opening or disconnecting the connection from detector 153 to laser 63, concurrent with switching output beam 144 off of the sodium resonance frequency.

To facilitate rapid frequency switching of output beam 144, rapid switching between lasers 11 and 157 is required while maintaining locking to both ring oscillator 27 and SFG 13. To ensure such locking, the free spectral ranges of these elements (the speed of light divided by the optical path length) should be commensurate, i.e., the optical path lengths of ring oscillator 27 and SFG 13, as well as the difference in frequency between lasers 11 and 157, are chosen such that this difference in frequency is an integer multiple of the free spectral range of the cavity of ring oscillator 27 and an integer multiple of the free spectral range of the cavity of SFG 13.

Alternatively, a second low-power 1319-nm laser juxtaposed with laser 63, along with a Faraday isolator, half-wave plate, directional mirror, polarization beam combiner, electro-optic polarization rotator, and polarization beam splitter, could be used in conjunction with laser 63 to switch output beam 144 on and off of the sodium resonance frequency. These elements would cooperate with laser 63 as previously described with respect to the switching function of 1064-nm laser 157 used in conjunction with laser 11, to the same effect.

To minimize the absorption of infrared light, all optical elements transmitting high-power 1319-nm light are made of INFRASIL® 301 optical quartz glass (fused silica). (INFRASIL is a registered trademark owned by Hereaus Corporation.) If too much light were to be absorbed, thermal lensing might occur.

As noted with respect to excitation source 4, the optical path length of SFG 13 is changed to maintain locking with the output of module 6 and the output of module 5 is adjusted to keep it locked to the optical path length of SFG 13. It is to be understood that this locking relationship could be reversed. In such a reversed configuration, the optical path length of SFG 13 would be adjusted to maintain locking with the output of module 5. The output of module 6 would then be adjusted to keep it locked with the optical path length of SFG 13.

Furthermore, another technique could be used as an alternative to the Pound-Drever-Hall stabilization technique disclosed herein, e.g., the Hansch-Couillaud technique. Moreover, piezoelectric transducers 49, 95 and 125 used for respectively adjusting optical path lengths are but one example of a number of apparatus that could be used for this purpose, e.g., voice coil actuators or stepper motors.

It should also be noted that the wavelength of output beam 144 might be varied from 589 nm to suit purposes other than creating a mesospheric guide star. For example, a different output wavelength could be obtained by substituting low-power lasers having wavelengths different than the 1064-nm and 1319-nm wavelengths of lasers 11 and 63, respectively. Such a substitution would necessitate modifying ring oscillators 27 and 75 to enable modules 5 and 6 to generate high-power single-frequency laser beams. Sodium-vapor cell 149 would also have to be replaced with an element for providing an appropriate wavelength reference standard for stabilizing output 144 at the desired reference wavelength.

Depending on the desired output wavelength, the composition of crystal 121 might also have to be changed. The low-power wavelengths necessary to obtain a high-power output beam 144 having a specific wavelength, together with the aforementioned requisite modifications to various elements of excitation source 4, could be calculated by or would otherwise be known to one skilled in optics.

It is to be understood that the preceding is merely a detailed description of several embodiments of this invention and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An optical apparatus for generating a high-power laser beam, comprising
   first high-power means for generating a first high-power optical output;
   second high-power means for generating a second high-power optical output;
   a sum-frequency generator for generating an optical SFG output having an SFG output wavelength derived from the first and second high-power optical outputs;
   the sum-frequency generator having an SFG optical path length, with the SFG optical path length being adjustable responsive to the second high-power optical output;
   the first high-power optical output being adjustable responsive to the SFG optical path length;
   means for detecting a difference in wavelength between the SFG output wavelength and a reference wavelength; and
   means for adjusting the second high-power means to reduce the wavelength difference to approximately zero.

2. An optical apparatus as defined by claim 1 wherein:
   the SFG optical path length is adjustable responsive to the second high-power optical output, for maintaining resonance with the second high-power optical output; and
   the first high-power optical output is adjustable responsive to the SFG optical path length, for maintaining resonance with the SFG optical path length.

3. An optical apparatus as defined by claim 2 wherein:
   a first laser having a low-power first laser output;
   the first high-power means being for generating the first high-power optical output by increasing the first laser output;

a second laser having a low-power second laser output; and the second high-power optical means being for generating the second high-power optical output by increasing the second laser output.

4. An optical apparatus as defined by claim 3 wherein:
the first high-power means is a first power oscillator; and
the second high-power means is a second power oscillator.

5. An optical apparatus as defined by claim 4 wherein the first high-power optical output is injection locked to the first laser output.

6. An optical apparatus as defined by claim 5 wherein the second high-power optical output is injection locked to the second laser output.

7. An optical apparatus as defined by claim 6 further comprising:
means for producing first phase sidebands on the first laser output; and
means for producing second phase sidebands on the second laser output, whereby a Pound-Drever-Hall stabilization technique is used to injection lock the first power oscillator to the first laser output, and to injection lock the second power oscillator to the second laser output.

8. An optical apparatus as defined by claim 7 wherein the first power oscillator is a ring oscillator including a Nd:YAG rod.

9. An optical apparatus as defined by claim 8 wherein the second power oscillator is a ring oscillator including a Nd:YAG rod.

10. An optical apparatus as defined by claim 8 wherein the sum-frequency generator includes a lithium triborate crystal.

11. An optical apparatus as defined by claim 10 wherein:
the first laser output has a wavelength of approximately 1064 nm;
the second laser output has a wavelength of approximately 1319 nm; and
the SFG output wavelength is approximately 589 nm.

12. An optical apparatus as defined by claim 7 further comprising:
an input coupler for the sum-frequency generator, for transmitting a substantial portion of the first and second high-power optical outputs and for reflecting a substantial portion of the first and second phase sidebands, whereby
a substantial portion of the first and second high-power optical outputs are transmitted into the sum-frequency generator and resonate therein, while a substantial portion of the first and second sidebands are prevented from entering the sum-frequency generator.

13. An optical apparatus as defined by claim 12 wherein:
the sum-frequency generator has a fold angle $\Theta$ of approximately 7°; and
the input coupler has reflectivities of approximately 0.954 at 1064 nm and approximately 0.925 at 1319 nm.

14. An optical apparatus as defined by claim 7 further comprising means for converting the SFG output to a circularly polarized beam.

15. An optical apparatus as defined by claim 2 wherein:
at least a portion of the SFG output passes through the detection means;
the detection means is for producing an SFG wavelength spectrum responsive to the SFG output wavelength;
the reference wavelength is for a desired SFG output, and has a reference spectral line; and the detection means is also for detecting any difference between the reference spectral line and the SFG wavelength spectrum.

16. An optical apparatus as defined by claim 15 wherein:
sodium $D_{2a}$ has a sodium $D_{2a}$ spectral line; and
the reference spectral line is the sodium $D_{2a}$ spectral line.

17. An optical apparatus as defined by claim 3 further comprising:
sodium $D_{2a}$ having a resonant wavelength; and
the reference wavelength being the sodium $D_{2a}$ resonant wavelength, whereby
a mesospheric guide star is created upon impingement of the SFG output on a celestial area; and further comprising
the first laser output having a first laser output wavelength
a third laser having a low-power third laser output;
the third laser output having a wavelength different than the first laser output wavelength; and
means for substituting the third laser output for the first laser output, whereby
the first high-power means increases the third laser output, the SFG output wavelength is temporarily different than the reference wavelength, and the mesospheric guidestar is temporarily extinguished.

18. An optical apparatus as defined by claim 17 wherein:
the substituting means is comprised of means for rapidly switching between the first laser output and third laser output, whereby
the mesospheric guide star is rapidly switched on and off.

19. An optical apparatus as defined by claim 18 wherein the switching means is comprised of an electro-optic polarization rotator.

20. A method of generating a high-power laser beam, comprising:
generating a first high-power optical output and a second high-power optical output;
communicating the first and second high-power optical outputs into a sum-frequency generator having an adjustable SFG optical path length;
generating an SFG output having an SFG wavelength from the sum-frequency generator;
maintaining resonance between the second high-power optical output and the sum frequency generator by adjusting the SFG optical path length responsive to the second high-power optical output,
maintaining resonance between the first high-power optical output and the sum-frequency generator by adjusting the first high-power optical output;
detecting a difference between the SFG wavelength and a reference wavelength; and
reducing the difference to approximately zero by adjusting the second high-power output.

21. A method of generating a high-power laser beam as defined in claim 20 wherein:
generating the first high-power optical output includes increasing a low-power laser output; and
generating the second high-power optical output includes increasing a low-power laser output.

22. A method of generating a high-power laser beam as defined in claim 21 wherein:
increasing the first low-power laser output includes communicating the first low-power laser output into a first high-power ring oscillator having an adjustable first optical path length, and injection locking the first high-power ring oscillator to the first low-power laser output by adjusting the first optical path length; and increasing the second low-power laser output includes communicating the second low-power laser output into a second high-power ring oscillator having an adjustable second optical path length, and injection locking the second high-power ring oscillator to the second low-power laser output by adjusting the second optical path length.

23. A method of generating a high-power laser beam as defined in claim 22 wherein:
   adjusting the first high-power optical output includes adjusting the first low-power laser output; and
   adjusting the second high-power optical output includes adjusting the second low-power laser output.

24. A method of generating a high-power laser beam as defined in claim 22 wherein:
   injection locking the first high-power ring oscillator to the first low-power laser output includes using a Pound-Drever-Hall stabilization technique; and
   and injection locking the second high-power ring oscillator to the second low-power laser output includes using the Pound-Drever-Hall stabilization technique.

25. A method of generating a high-power laser beam as defined in claim 20 wherein:
   maintaining resonance between the first high-power optical output and the sum-frequency generator includes using a Pound-Drever-Hall stabilization technique; and
   maintaining resonance between the second high-power optical output and the sum-frequency generator includes using the Pound-Drever-Hall stabilization technique.

26. A method of generating a high-power laser beam as defined in claim 20 further comprising the step of converting the SFG output to a circularly polarized beam.

* * * * *